April 25, 1939.　　　J. VAN DER MEULEN　　　2,156,211

TEAT CUP FOR MILKING MACHINES

Filed Nov. 17, 1937

Inventor
John VanDer Meulen

By T. F. Bryant
Attorney.

Patented Apr. 25, 1939

2,156,211

UNITED STATES PATENT OFFICE 2,156,211

TEAT CUP FOR MILKING MACHINES

John Van Der Meulen, Blooming Grove, N. Y.

Application November 17, 1937, Serial No. 175,087

1 Claim. (Cl. 31—85)

This invention relates to improvements in teat cups for milking machines, and more particularly to a teat cup operated by compressed air or air under pressure.

The primary object of this invention is to provide a teat cup of the above mentioned character which creates a milking action very similar to a person's hand when applied to the cow's teats such as a combined squeezing action and downward pull upon the teats simultaneously.

A further object of this invention is to provide a device of the above mentioned character which will not have the injurious effects to the cow performed by a suction machine and which comprises comparatively few parts to become out of order or disarranged.

A still further object of this invention is to provide a teat cup of the above mentioned character which is operated by pulsations created by compressed air which fills an inner chamber and compresses or expands an annular rubber sleeve into engagement with the cow's teats to perform a squeezing action and a downward motion which causes the milking operation.

Other objects and advantages of the invention will become apparent during the course of the following description, taken with the drawing, wherein.

Figure 1:
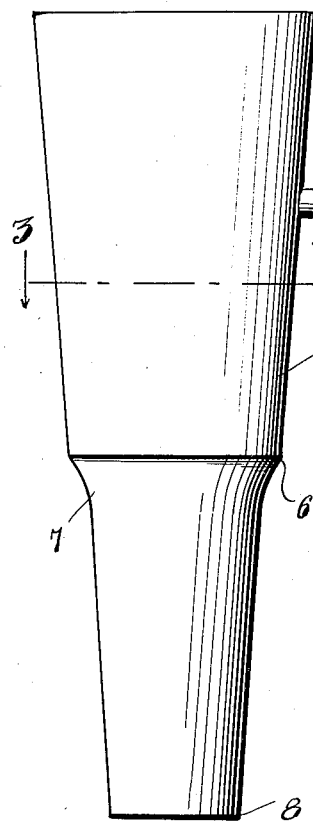
Figure 1 is a side elevational view of the device embodying this invention, illustrating the general contour of the teat cup and also showing the compressed air pipe connection having an interposed relief valve to cause alternate pulsations of the annular inner chamber.
Figure 2:
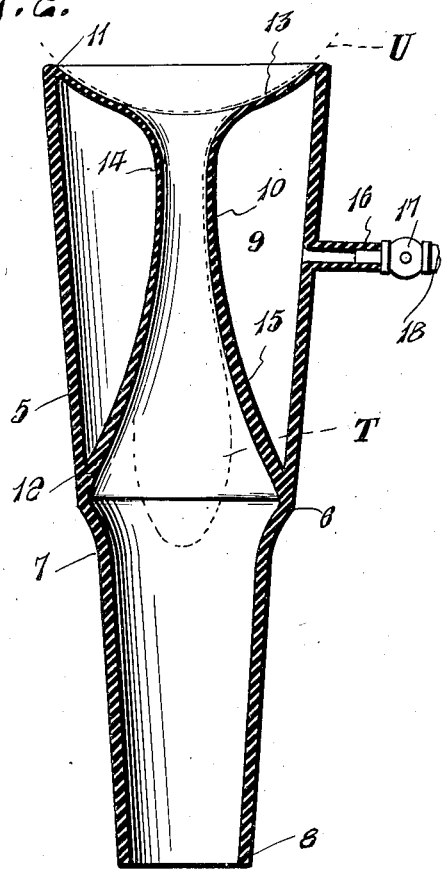
Figure 2 is a vertical cross-sectional view of the device embodying this invention illustrating the same as applied to a cow's teat.
Figure 3:
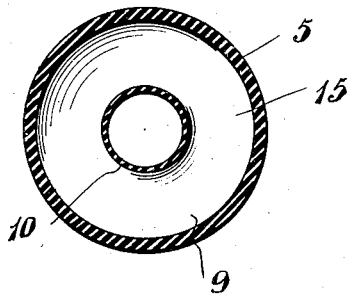
Figure 3 is a transverse cross-sectional view taken on line 3—3 of Figure 1, looking in the direction of the arrows, illustrating the inner annular chamber having an inner wall formed of flexible material.

In the drawing, wherein for the purpose of illustrating the invention and wherein like reference characters will be employed to designate like parts throughout the same, the reference character 5 will generally be employed to designate a teat cup preferably formed of a semi-flexible material such as rubber.

The upper end of the teat cup 5 is open and said teat cup extends downwardly in a tapered formation to its median line 6 where it is tapered inwardly as at 7 and has its lower end 8 tapered for receiving a flexible hose connection or the like.

Mounted within the teat cup 5 above the median line 6 is an annular chamber 9 formed by means of thin flexible rubber sleeve 10 which is adapted to embrace the teats T of the cow's udder U. The upper end of the flexible rubber sleeve 10 is connected to the open end of the teat cup 5 as at 11 by vulcanizing or by using a rubber cement or adhesive. The lower end of the compressible rubber member 10 is fastened as at 12 to the inner wall of the teat cup 5 adjacent the median line 6, in the same manner. It will be noted, that the upper end of the flexible rubber sleeve 10 is curved in a concaved fashion as at 13 to form a tight fit with the cow's udder U when the teat cup 5 is placed in position. The thin rubber flexible sleeve 10 is capable of being first compressed near the upper end thereof as at 14 and upon further admittance of pressure to the chamber 9 the thin rubber sleeve 10 will compress downwardly as at 15 and produce a squeezing action upon the teats T. It is intended to form the rubber sleeve 10 adjacent the area 14 thinner than the lower portion as around the area 15 to produce the above mentioned squeezing effect with simultaneous downward squeezing action. It is obvious, that when air under pressure is forced into the chamber 9 the annular sleeve 10 will first be compressed inwardly to a smaller size at the upper end thereof at the thinnest portion and will gradually be compressed inwardly in a downward direction during the admittance of further pressure.

The teat cup 5 is provided with a fitting 16 for connection with a relief valve 17 adapted to create pulsations within the chamber 9 when air is forced therein through the pipe line 18.

It is proposed to use any form of conventional compressor having sufficient pressure to fill the chamber 9 to cause the alternate contraction and expansion of the rubber sleeve 10.

It is to be understood that the form of invention herewith shown and described is to be taken as the preferred embodiment of the same and that various changes in the shape, size and arrangement of parts may be resorted to without departing from the spirit of the invention or the scope of the subjoined claim.

I claim:

A teat cup of the character described comprising in combination an outer conical member formed of semi-rigid material and of tapered formation with a shoulder between the upper and lower ends thereof, an inner conical member of lesser diameter having its upper end connected to the side wall of the upper end of the outer member and its lower end connected to the shoulder of the outer cylindrical member and forming an annular chamber between said members, means for admitting air pulsations to the annular chamber, and the inner wall of the annular chamber being smooth and gradually increasing in thickness downwardly whereby air pulsations admitted to said annular chamber effect inward compression of the inner wall of the annular chamber from the upper end thereof downwardly.

JOHN VAN DER MEULEN.